United States Patent [19]

Rubinstein et al.

[11] 4,398,067

[45] Aug. 9, 1983

[54] LOCKING DEVICE FOR TELEPHONE INSTRUMENT

[76] Inventors: Herbert J. Rubinstein, 15720 Winchester Blvd., Ste. 2C, Los Gatos, Calif. 95030; Morton K. Rubinstein, 14954 Corona Del Mar, Pacific Palisades, Calif. 90272

[21] Appl. No.: 129,470

[22] Filed: Mar. 11, 1980

[51] Int. Cl.³ .................... H01H 9/28; H04M 1/66
[52] U.S. Cl. .................... 179/189 D; 70/DIG. 30; 179/90 D; 179/189 R; 200/44
[58] Field of Search ............ 179/90 D, 189 D, 189 R, 179/161, 162, 167, 158 R; 200/44, 61.64, 61.62; 70/DIG. 30, DIG. 72

[56] References Cited

U.S. PATENT DOCUMENTS 1,077,225 10/1913 Keith .................................. 179/103
2,685,002 7/1954 Reilly .............................. 179/189 D

FOREIGN PATENT DOCUMENTS 863432 2/1971 Canada ........................... 179/90 D
954024 12/1949 France .......................... 70/DIG. 72

Primary Examiner—Thomas W. Brown
Attorney, Agent, or Firm—Jack M. Wiseman; Francis W. Anderson

[57] ABSTRACT

Telephone instruments have an apertured base through which project depressible dialing elements, such as touch tone keys or push buttons. A locking device for telephone instruments with depressible keys or buttons comprises a body fixed to the base and formed with a bore therethrough. Disposed within the bore of the body is a movable member that has one end thereof projecting over a depressible dialing element. By moving the movable member in one direction, a depressible dialing element is depressed to lock the telephone instrument. By moving the movable member in an opposite direction, the depressed dialing element under its own yieldable action rises to become fully extended to enable the telephone instrument to be operated.

18 Claims, 10 Drawing Figures

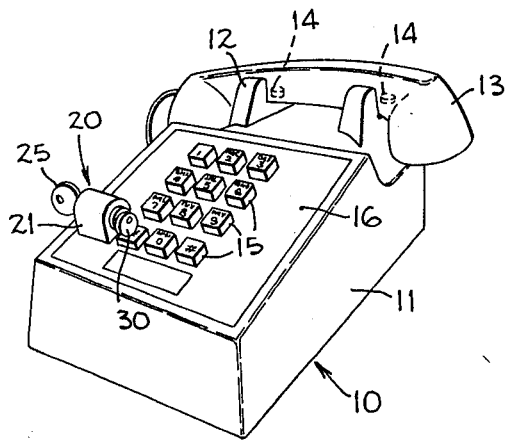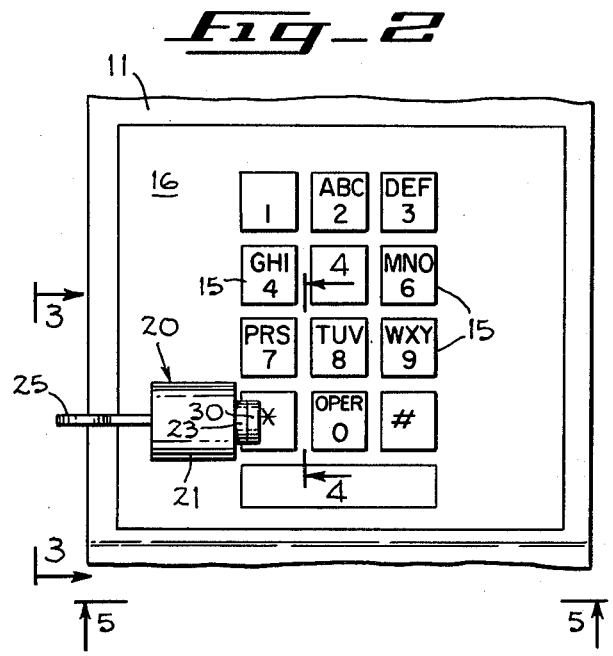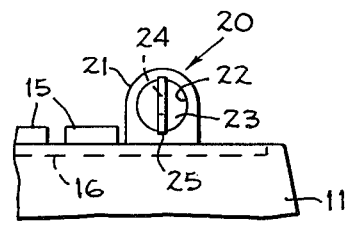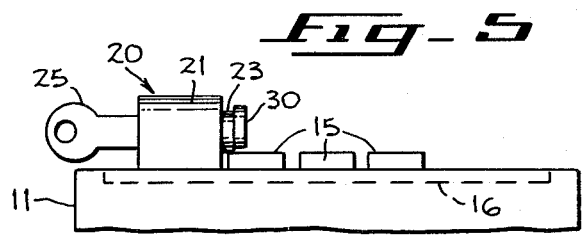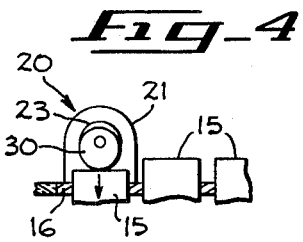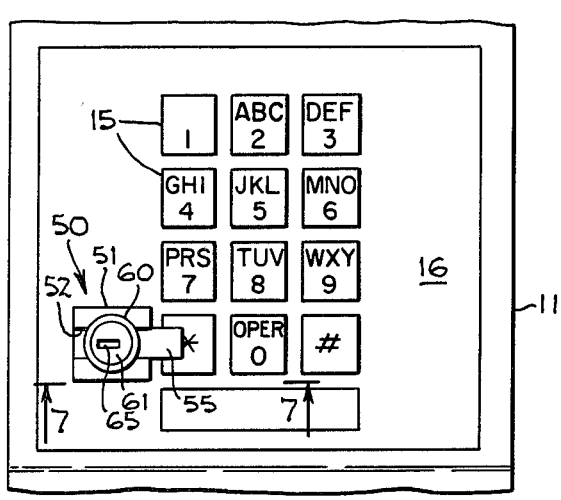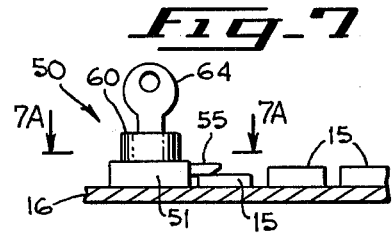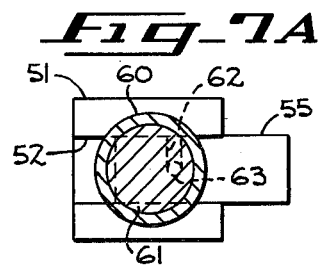

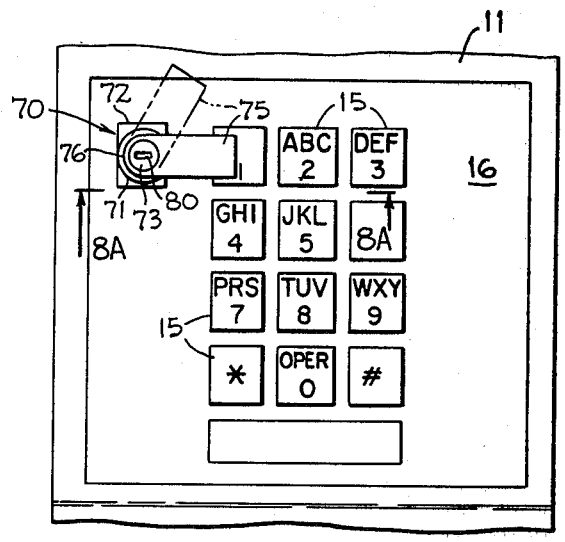
_Fig_8
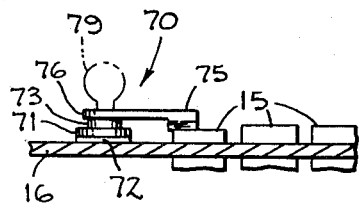
_Fig_8A

LOCKING DEVICE FOR TELEPHONE INSTRUMENT

BACKGROUND OF THE INVENTION

The present invention relates in general to locking devices for telephone instruments, and more particularly to a locking device for a telephone instrument having a depressible key or button for dialing.

Heretofore, telephone locking devices have been employed to lock telephone instruments having dials rotatable by an operator's finger. A locking device for such an instrument would have a removable key that caused the actuation of a clamp for entering the finger hole to prevent the rotation of the dial. In order to use the telephone instrument, the locking device was removed from the penetrated finger hole and the clamp was removed from clamping engagement with the rotatable dial.

Another locking device heretofore employed to lock telephone instruments, which had either a rotatable dial or a depressible dialing element, required the handset of the telephone instrument to be removed from the cradle. After the handset was removed from the cradle of the telephone instrument, the locking device depressed a cradle plunger and retained the cradle plunger in a depressed state. The telephone instrument could not be operated with the cradle plunger depressed.

The locking devices heretofore employed for locking telephone instruments with depressible dialing elements were found to be unduly expensive and unduly inconvenient.

In the patent to Roof, U.S. Pat. No. 3,780,234, issued on Dec. 18, 1973, for Lock For Press Button Telephones, there is disclosed a key controlled device having conductors connected to the Touch Toner key circuit. The locking device included key actuated switches to make or break the circuit connection to the Touch Tone key circuit.

The patent to Richards, Sr., U.S. Pat. No. 3,712,964, issued on Jan. 23, 1973, for Lock for Telephone Instrument describes a locking device that is disposable within the cradle of the telephone instrument. When the body of the locking device is disposed within the cradle of the telephone instrument, the body depresses a cradle plunger of the telephone instrument. After the cradle plunger is depressed, a locking key for the locking device is actuated to pivot a locking member of the locking device into locking engagement with the base of the telephone instrument. To release the cradle plunger, the locking key is actuated to disengage the pivotal member of the locking device from the base of the telephone instrument and the locking device is removed from the cradle of the telephone instrument.

The patent to Mendenbach, U.S. Pat. No. 2,864,906, issued on Dec. 16, 1958, for Locking Device For French Phone, discloses a locking device that clamps the handset of the telephone instrument in the cradle of the telephone instrument by engagement with the base of the telephone instrument. While the handset is locked in the cradle, the cradle plunger is depressed.

The patent to Bart, U.S. Pat. No. 3,495,050, issued on Feb. 10, 1970, for Telephone Lock describes a telephone dial shield that is locked to the base of the telephone instrument.

In the patent to Buckingham, U.S. Pat. No. 3,624,317, issued on Nov. 30, 1971, for Telephone Lock, there is disclosed a locking device with a base plate that seats in the cradle of the telephone instrument between the cradle plungers. A locking plate is detachably secured by a cylindrical lock and cam to the base plate of the telephone instrument. When the locking plate is so secured, the locking plate engages the cradle plungers of the telephone instrument to depress the cradle plungers. When the locking plate is removed from the base plate, the cradle plungers are released.

A similar arrangement is disclosed in the patent to Wagoner, U.S. Pat. No. 3,939,678, issued on Feb. 24, 1976, for Telephone Locking Apparatus, and in the patent to Edelcreek, U.S. Pat. No. 3,723,671, issued on Mar. 27, 1973, for Telephone Lock. See also the patent to Benson, U.S. Pat. No. 2,641,659, issued on June 9, 1953, for Telephone Lock and the patent to Foote, U.S. Pat. No. 3,598,931, issued on Aug. 10, 1971, for Telephone Set Locks. Other patents of interest are the patent to Rudolph, U.S. Pat. No. 3,823,277, issued on July 9, 1974, for Telephone Locking Device and the patent to Nimer, U.S. Pat. No. 3,069,513, issued on Dec. 18, 1962, for Telephone Clamps.

SUMMARY OF THE INVENTION

In combination, a telephone instrument has an apertured base through which projects at least one depressible dialing element. A locking device comprising a body is mounted on the base of the telephone instrument. The body of the locking device is formed with a bore therethrough. A movable member is disposed within the bore of the body. One end of the movable member projects in the direction of a dialing element. By moving the movable member in one direction, the dialing element is depressed to inhibit the activation of the dial element. Inhibiting the activation of the dial element results in the deactivation of the remaining dial elements and the telephone instrument. By moving the movable member in an opposite direction, the movable member enables the activation of the dial element.

A feature of the present invention is that the body of the locking device is fixedly secured to the base of the telephone instrument so that the only removable component is the removable locking key.

An object of the present invention is to provide a locking device for a telephone instrument with Touch Tone keys or push button keys that is economical to manufacture, and, yet, is convenient to employ and does not require the making or breaking of an electrical connection.

Another feature of the present invention is that the locking device retains a dialing element of the telephone instrument, such as a Touch Tone key or push button, depressed during a locked state and releases the depressed dialing element during the unlocked state so that the depressed dialing element under its own yieldable action becomes fully extended. When a Touch Tone key is depressed during the locked state and the handset of the telephone instrument is removed from the cradle to release the cradle plungers, a loud high-pitched sound is heard from the telephone instrument receiver. When a Touch Tone key is depressed, the handset of the telephone instrument does not operate to initiate any outgoing call. When a Touch Tone is depressed and the receiver is on the cradle, the telephone instrument bell rings in a normal manner. The lifting of the handset from the cradle of the telephone instrument releases the cradle plungers to discontinue the ringing of the bell of the telephone instrument and a high-pitched tone will be heard from the receiver of the telephone instrument handset at the called station and at the calling station. However, there will be no transmission therebetween for communication.

DESCRIPTION OF THE DRAWINGS

FIG. 1 is a perspective view of a TOUCH TONE telephone instrument and a locking device therefor.

FIG. 2 is a plan view of the telephone base of the telephone instrument shown in FIG. 1 and the locking device therefor.

FIG. 3 is an end elevation view taken along line 3—3 of FIG. 2 of the locking device shown in FIGS. 1 and 2 and illustrated mounted on a panel of the base of the telephone instrument.

FIG. 4 is an end elevation view taken along line 4—4 of FIG. 2 of the locking device shown in FIGS. 1 and 2 and illustrated mounted on a panel of the base of the telephone instrument with the cam thereof depressing a touch tone key.

FIG. 5 is a side elevation view taken along line 5—5 of FIG. 2 of the locking device shown in FIGS. 1 and 2 and illustrated mounted on a panel of the base of the telephone instrument with the cam thereof extending away from the TOUCH TONE key to release the same.

FIG. 6 is a plan view of the telephone base of the telephone instrument shown in FIG. 1 and illustrating a modification of the locking device shown in FIGS. 1-5.

FIG. 7 is a side elevation view taken along line 7—7 of FIG. 6 of the locking device shown in FIG. 6 illustrating the sliding member depressing a TOUCH TONE key.

FIG. 7A is a horizontal sectional view taken along line 7A—7A of FIG. 7.

FIG. 8 is a plan view of the telephone base of the telephone instrument shown in FIG. 1 and illustrating a further modification of the locking device shown in FIGS. 1-5.

FIG. 8A is a side elevation view of the locking device shown in FIG. 8 taken along line 8A—8A of FIG. 8 and illustrating the swivel member thereof disposed in a dialing element locking position.

DESCRIPTION OF THE PREFERRED EMBODIMENTS

Illustrated in FIG. 1 is a conventional telephone instrument 10 having a base 11, a cradle 12, a handset 13, cradle plungers 14 and dialing elements 15. The base 11 includes an apertured panel 16 through which project the dialing elements 15. The dialing elements 15 are depressible dialing elements, such as TOUCH TONE keys or push buttons. TOUCH TONE dialing and push button dialing have been well-known in the telephone instrument art.

A locking device 20 (FIG. 2) is mounted on the base 11 of the telephone instrument 10. The locking device 20 comprises a body 21 that is fixed to the panel 16 of the base 11 of the telephone instrument 10 by suitable means, such as screws, rivets, epoxy resin, and adhesives. A bore 22 is formed in the body 21 and extends therethrough. The axis of the bore 22 is parallel to the plane of the base panel 16.

Disposed within the bore 22 is a rotatable member 23. At one end of the rotatable member 23 is formed a suitable locking key slot 24. A suitable removable locking key 25 is insertable in the locking key slot 24. When the removable locking key 25 mates with the locking key slot 24, the locking key 25 is turned by an operator to rotate the rotatable member 23 about its axis within the bore 22. The body 21, the bore 22, the rotatable member 23, the locking key slot 24 and the locking key 25 are well-known as a locking device, which locking device is conventional and is commercially available. It is within the present invention that a combination lock arrangement could be employed in lieu of a removable key and the rotatable member can be rotated manually by an operator.

The other end of the rotatable member 23 projects toward a dialing element 15. Fixedly secured to the other end of the rotatable member 23 for rotation therewith is an eccentric member or cam 30. The eccentric cam 30 confronts or overlies one of the dialing elements 15. By inserting the removable locking key 25 into the locking key slot 24 and turning the locking key 25 in one direction (FIG. 4), the cam 30 depresses the confronting or underlying depressible dialing element 15 to lock the telephone instrument 10. By turning the removable locking key 25 in an opposite direction (FIG. 5), the cam 30 releases the depressed dialing element 15 and the depressed dialing element 15 under its yieldable action becomes fully extended through the base panel 16.

When a TOUCH TONE key 15 is depressed by the locking device 20 and the handset 13 of the telephone instrument 10 is removed from the cradle 12 of the telephone instrument 10, a loud high-pitched tone is heard from the receiver of the handset 13. When a TOUCH TONE key 15 is depressed by the locking device 20, outgoing calls cannot be initiated from the telephone instrument 10. When a TOUCH TONE key 15 is depressed by the locking device 20, the telephone instrument will operate its bell for ringing in a normal manner. If the handset 13 is not removed from the cradle 12, the telephone instrument 10 will continue to ring the bell thereof in a normal manner without any indication of the locking device 20 being used to the calling party. If the handset 13 is removed from the cradle 12, the ringing of the bell for the telephone instrument 10 will be discontinued. A loud high-pitched tone will be heard from the receiver of the handset 13 of the called party and the receiver of the handset of the calling party. However, there will be no transmission therebetween for communications.

It is to be observed that the body 21 is preferably fixed to the panel 16 adjacent to a * key or a # key. These keys are not used in normal dialing and are located in the outer columns. Therefore, the locking device, when in the unlocked condition, does not interfere with the normal operation of the telephone instrument. Thus, the location of the body 21 is convenient for a locking device. The TOUCH TONE keys are conventionally arranged in rows and columns in the panel 16 and the openings formed in the panel 16 to receive the TOUCH TONE keys are also arranged in rows and columns.

Illustrated in FIGS. 6 and 7 is the telephone instrument 10 which includes the depressible dialing elements 15, such as TOUCH TONE keys and push buttons. The depressible dialing elements 15 project through the apertured panel 16 of the base 11 of the telephone instrument 10. A locking device 50 (FIGS. 6 and 7) is a modification of the locking device 20 shown in FIGS. 1-5.

The locking device 50 comprises a mounting plate 51 fixedly secured to the panel 16 of the base 11 in a suitable manner, such as by screws, rivets, epoxy resin and adhesives. A suitable channel 52 is formed in the base 51 parallel to the panel 16 of the base 11. Disposed within the channel 52 is a sliding member 55. The sliding member 55 is movable when the key is rotated by an operator. When the sliding member 55 is moved outwardly from the channel 52 in confronting relation with the depressible dialing element 15, it engages the depressible dialing element 15 to depress the same to lock the telephone instrument 10. When the sliding member 55 is moved inwardly within the channel 52, the sliding member 55 releases the depressed dialing member 15 to enable the telephone instrument 10 to operate.

Fixed to the mounting plate 51 and disposed above the sliding member 55 in spaced relation is a cylinder 60. Rotatable within the bore of the cylinder 60 is a cylindrical block or rotatable member 61. The cylinder 60 and the rotatable member 61 have a common axis, which is perpendicular to the plane of the panel 16. Formed in the sliding member 55 is a keyway 62 and projecting from the rotatable member 61 is a pin 63 that is disposed in the keyway 62. When a locking key 64 mates with a locking key slot 65, the rotatable member 61 is rotatable. As a consequence of rotating the rotatable member 61, the pin 62 moves within the keyway 62 to impart a sliding movement to the sliding member 55 along a rectilinear path. By rotating the key 64 in one direction, the sliding member 55 is moved outwardly from the channel 52 to depress the dialing element 15. By rotating the key 64 in the opposite direction, the sliding member 55 is moved within the channel 52 to release the depressed dialing member 15. The mounting plate 51, the cylinder 60, the rotatable member 61, the sliding member 55, the keyway 62, the pin 63, the key 64 and the key slot 65 are well-known as a locking device, which locking device is conventional and commercially available.

Illustrated in FIGS. 8 and 8A is the telephone instrument 10, which includes the depressible dialing elements 15, such as TOUCH TONE keys and push buttons. The depressible dialing elements 15 project through the apertured panel 16 of the base 11 of the telephone instrument 10. A locking device 70 (FIGS. 8 and 8A) is a further modification of the locking device 20 shown in FIGS. 1-5.

The locking device 70 comprises a cylindrical body 71 fixedly secured to the panel 16 of the base 11 of the telephone instrument 10 in a suitable manner, such as by screws, rivets, epoxy resin and adhesives. The body 71 may be integrally formed with a mounting plate 72 that is fixed to the panel 11. Formed in the body 71 is a cylindrical bore 73. The axis of the bore 73 is perpendicular to the plane of the panel 16. A rotatable member 75 swings or rotates about the axis of the bore 73 in a plane parallel to the plane of the panel member 16. At one end of the rotatable member 75 is a hub 76 that seats in the bore 73 and is rotatable therein. The hub 76 is preferably integrally formed with the rotatable member 75.

As previously described, the rotatable member 75 is rotatable about the axis of the bore 73 formed in the body 71 in a plane parallel to the plane of the panel member 16. The length of the rotatable member 75 is sufficient for it to engage the depressible dialing element 15. By rotating the rotatable member 75 in a direction for it to confront the depressible dialing element 15, the rotatable member 75 depresses the depressible dialing element 15. By rotating the rotatable member 75 away from the depressed dialing element 15, it releases the depressed dialing element 15 and the depressed dialing element 15 becomes fully extended under its yieldable action.

A locking key slot 80 is formed in the hub 76 of the rotatable member 75. A removable locking key 79 is insertable in the locking key slot 80. When the removable locking key 79 and the locking key slot 80 mate, the locking key 79 inserted in the locking key slot 80 is rotatable to impart a swinging movement or rotation to the rotatable member 75 about the axis of the hub 76 and the cylindrical body 71. By rotating the rotatable member 75 thorugh the key 79 so that it confronts the depressible dialing element 15, the depressible dialing element 15 is depressed. The removable locking key 79 is removed from the locking key slot 80 and the dialing element 15 is retained in a depressed state by the rotatable member 75. By inserting the locking key 79 into the locking key slot 80, the rotatable member 75 is rotated away from the depressed dialing element 15 and the depressed dialing element 15 is released. Thereupon, the depressed dialing element becomes fully extended under its yieldable action. The locking device 70 can be employed on any dialing element along an exterior row or column as the sliding member is not in the path of the dialing element when in the unlocked condition.

We claim:

1. In combination:
(A) a telephone instrument having an apertured base through which projects at least one depressible dialing element; and
(B) a locking device comprising;
  (a) a body mounted on said base of said telephone instrument, said body being formed with a bore; and
  (b) a movable member disposed in said bore, one end of said movable member being movable in one direction into confronting relation with said dialing element for depressing said depressible dialing element for locking said telephone instrument and being movable in another direction for releasing said depressed dialing element to enable said telephone instrument to operate.

2. The combination as claimed in claim 1 wherein said body of said locking device is fixedly secured to said base of said telephone instrument.

3. The combination as claimed in claim 1 wherein said depressible dialing element is a TOUCH TONE key.

4. The combination as claimed in claim 1 wherein said depressible dialing element is a push button.

5. The conbination as claimed in claim 1 wherein said movable member is rotatable in said bore, and said locking device further comprising an eccentric member fixed to said one end of said movable member for rotation therewith, rotation of said movable member in said one direction rotates said eccentric member to depress said depressible dialing element to lock said telephone instrument, rotation of said movable member in said other direction releases said depressed dialing element to enable said depressed dialing element to be extended for operating said telephone instrument.

6. The combination as claimed in claim 5 wherein the other end of said movable member is formed with a locking key slot, and a removable locking key is inserted into said locking key slot in mated relation therewith for imparting rotation to said movable member.

7. The combination as claimed in claim 6 wherein said base of said telephone instrument includes an apertured panel through which said depressible dialing element projects and on which said body of said locking device is fixedly secured, the axis of said bore formed in said body being parallel to the plane of said panel and the rotation of said movable member is about said axis.

8. In combination:
(A) a telephone instrument having an apertured base through which projects at least one depressible dialing element; and
(B) a locking device comprising:
  (a) a mounting plate mounted on said base of said telephone instrument, said mounting plate being formed with an opening extending toward said dialing element;
  (b) a movable member disposed in said opening for sliding movement over a rectilinear path; and
  (c) means mounted on said plate and operatively interacting with said movable member for moving said movable member in one direction in said opening into confronting relation with said dialing element for depressing said dialing element for locking said telephone instrument and for moving said movable member in an opposite direction in said opening for releasing said depressed dialing element to enable said depressed dialing element to be extended to enable said telephone instrument to operate.

9. The combination as claimed in claim 8 wherein said mounting plate of said locking device is fixedly secured to said base of said telephone instrument.

10. The combination as claimed in claim 8 wherein said depressible dialing element is a TOUCH TONE key.

11. The combination as claimed in claim 8 wherein said depressible dialing element is a push button.

12. The combination as claimed in claim 8 wherein said base of said telephone instrument includes an apertured panel through which said depressible dialing element projects and on which said mounting plate of said locking device is fixedly secured, said opening in said mounting plate being in a plane parallel to the plane of said panel and the rectilinear movement of said movable member is over a path parallel to the plane of said panel.

13. The combination as claimed in claim 8 wherein said means for said locking device comprises:
(a) a cylindrical body mounted on said mounting plate above said movable member, said body being formed with a bore therethrough, the axis of said body and said bore being perpendicular to a plane passing through said movable member; and
(b) a rotatable member disposed in said bore for rotation therein and interacting with said movable member for imparting a sliding movement to said movable member within said opening.

14. The combination as claimed in claim 13 wherein said rotatable member includes a locking key slot, and a removable locking key is inserted into said locking key slot in mated relation therewith for imparting rotation to said rotatable member to impart a sliding movement to said movable member.

15. The combination as claimed in claim 1 wherein said base of said telephone instrument includes an apertured panel through which said dialing element projects and on which said body of said locking device is mounted, the axis of said bore in said body being perpendicular to the plane of said panel, said movable member at its other end being formed with a hub disposed in said bore for rotating said movable member about the axis of said bore and in a plane parallel to the plane of said panel.

16. The combination as claimed in claim 15 wherein said body of said locking device is fixedly secured to said panel of said base of said telephone instrument.

17. The combination as claimed in claim 16 wherein a locking key slot is formed in said hub, and a removable locking key is inserted into said locking key slot in mated relation therewith for imparting rotation to said movable member.

18. In combination:
(a) a telephone instrument having an apertured base through which projects at least one depressible dialing element; and
(b) a locking device mounted on said telephone instrument, said locking device comprising a movable member, said movable member being movable in one direction in to confronting relation with said dialing element for depressing said depressible dialing element to lock said telephone instrument and being movable in another direction for releasing said depressed dialing element to enable said telephone instrument to operate.

* * * * *